United States Patent
Sierk et al.

(10) Patent No.: US 6,651,412 B1
(45) Date of Patent: Nov. 25, 2003

(54) FORWARD CLUTCH DRIVE FOR WINDROW HEADER WITH POSITIVE REVERSE DRIVE

(75) Inventors: Randall L. Sierk, Christiana, PA (US); Anthony F. Diederich, Jr., Terre Hill, PA (US); Wayne D. Thaxton, Denver, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/282,551

(22) Filed: Oct. 29, 2002

(51) Int. Cl.[7] .............................................. A01D 69/08
(52) U.S. Cl. ......................................... 56/10.3; 56/11.2
(58) Field of Search ............................ 56/10.2 R, 10.3, 56/11.2, 11.3, DIG. 6, DIG. 15, 10.8; 198/674, 675

(56) References Cited

U.S. PATENT DOCUMENTS

| 3,324,639 A | 6/1967 | Halls et al. ..................... 56/23 |
|---|---|---|
| 3,958,397 A | * 5/1976 | Stiff ............................. 56/10.3 |
| 3,958,399 A | 5/1976 | Schoeneberger ............. 56/15.8 |
| 4,155,228 A | * 5/1979 | Burgener et al. ............. 68/133 |
| 4,193,248 A | * 3/1980 | Gilleman ........................ 460/3 |
| 4,216,641 A | 8/1980 | Koch et al. ................... 56/14.4 |
| 4,218,864 A | * 8/1980 | Allemeersch et al. ........ 56/11.2 |
| 4,261,161 A | * 4/1981 | Colgrove et al. .............. 460/3 |
| 4,296,592 A | 10/1981 | McIlwain .................... 56/14.4 |
| 4,663,919 A | 5/1987 | Stroh et al. ................... 56/11.2 |
| 5,527,218 A | * 6/1996 | Van den Bossche et al. . 460/20 |
| 6,073,431 A | 6/2000 | Osborne et al. ............. 56/15.7 |
| 6,318,056 B1 | * 11/2001 | Rauch et al. ............. 56/10.2 J |

\* cited by examiner

*Primary Examiner*—Robert E. Pezzuto
*Assistant Examiner*—Nathan Mammen
(74) *Attorney, Agent, or Firm*—John William Stader; Collin A. Webb; Rebecca L. Henkel

(57) ABSTRACT

A drive system for the auger of a crop-harvesting header that includes a slip clutch to slow or stop auger rotation upon encountering a slug or foreign object of sufficient size, and pawls on the drive sprocket that engage a ratchet wheel on the auger drive shaft when the drive is reversed to provide positive power to the auger in reverse to eject the obstruction.

11 Claims, 4 Drawing Sheets

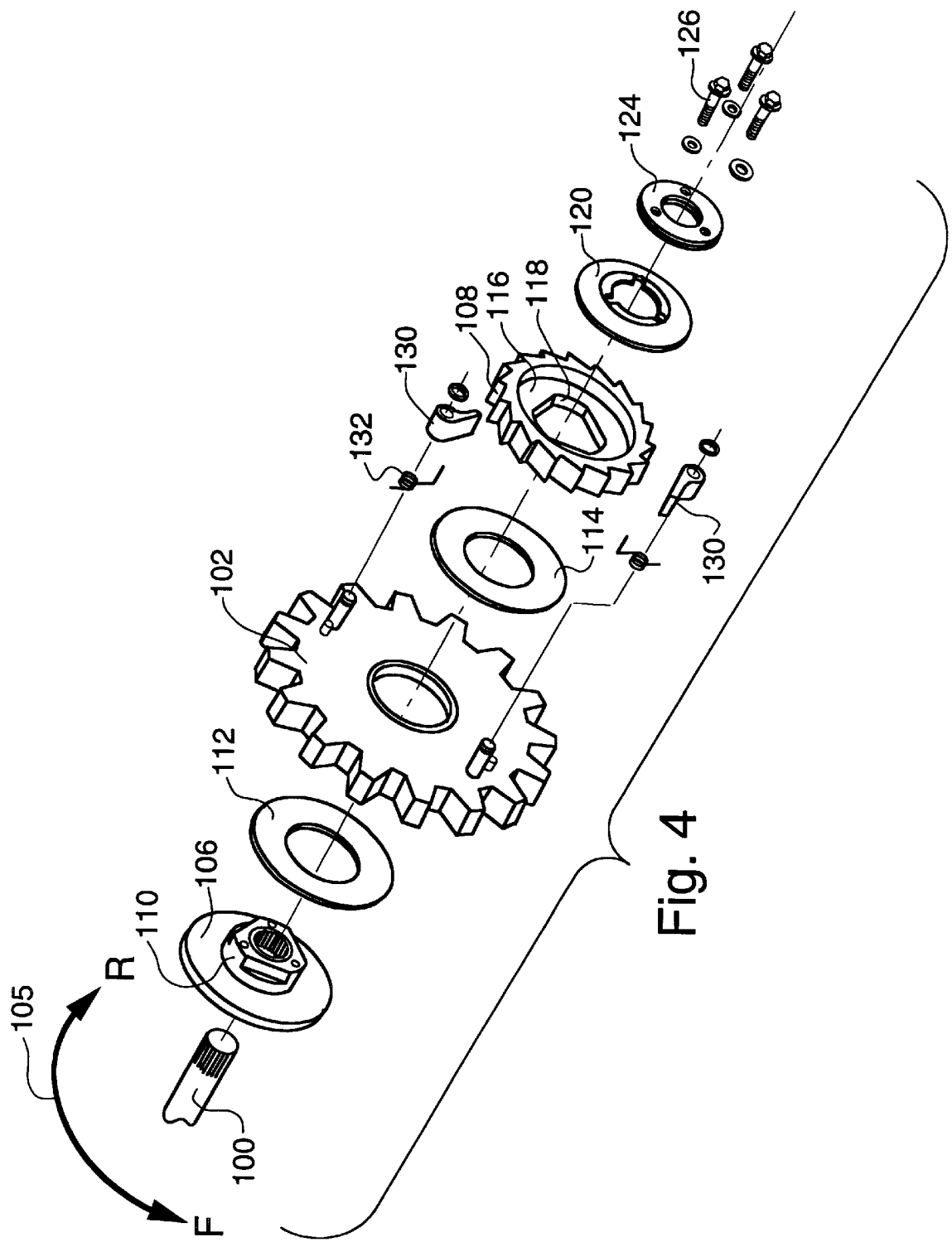

FORWARD CLUTCH DRIVE FOR WINDROW HEADER WITH POSITIVE REVERSE DRIVE

BACKGROUND OF THE INVENTION

This invention relates generally to headers for crop-harvesting machines, and more particularly to an auger header connectable to the forward end of a specialized tractor, thereby forming what is generally know in the agricultural business as a swather or windrower. Even more particularly, the instant invention relates to the use of a slip clutch in the drive system of the auger of crop-harvesting header that allows, upon plugging of the auger, the drive to continue while the auger stops or slows. When the drive is reversed to back out the slug, a ratchet wheel on the auger drive shaft positively powers the auger in reverse, not allowing the clutch to slip.

In modern agriculture, especially in regard to harvesting forage crops, it is the present tendency to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations such as baling. The arranging of the crop into a continuous windrow around the field primarily is to facilitate the baling thereof.

Many older swather or windrower implements employed endless draper conveyors for purposes of consolidating a relatively wide swath of cut material into a narrower band thereof and then discharged onto the field as a windrow. Such devices offer various types of difficulties in that, as is well known, endless conveyors in agricultural equipment gradually stretch and also are subject to rather rapid wear, especially if carelessly used.

The more recent designs of windrower headers employ a consolidating auger operationally behind a cutterhead and rotating reel to receive the cut crop material and convey it centrally of the header from either lateral end portion thereof for feeding into a crop-conditioning mechanism, conditioning rolls, for instance. A header of this type is shown and described in U.S. Pat. No. 3,324,639 issued to L. M. Halls et al. on Jun. 13, 1967. A major problem encountered by such machines relates to plugging. Crop materials, weeds, and combinations thereof sometimes form into balls or tight seemingly large wads, known as slugs, that do not conveniently feed through and along the auger. One way to address this issue is to employ a floating auger, such as shown in the above-identified '639 patent or in U.S. Pat. No. 4,296,592 issued to Irwin D. McIlwain on Oct. 27, 1981. The floating auger is generally free to move vertically, thus allowing most slugs a better opportunity to follow the auger to the central consolidating area.

It would be helpful to have a drive system of the general type herein described with a simpler and more reliable mechanism for handling the slugs that are inevitably encountered during field operations. The instant invention provides such an alternative.

SUMMARY OF THE INVENTION

Accordingly, one object of the present invention is to provide an alternative mechanism for ejecting or extracting slugs from the auger of a crop-arvesting header.

Another object of the present invention is to provide a novel drive mechanism for the auger of a crop-harvesting header including a slip clutch to prevent damage from slugs and to provide a positive reverse drive to either eject slugs or push them into a position for extraction.

It is another object of the instant invention to provide a drive mechanism for the auger of a crop-harvesting header including a slip clutch with friction discs to allow the main drive to continue to turn while the auger either stops or slows.

Yet another object of the present invention is to provide a drive mechanism for the auger of a crop-harvesting header including pawls on the auger sprocket to engage a ratchet wheel on the auger drive shaft to positively drive the auger in the reverse direction when ejecting slugs.

It is yet another object of this invention to provide an improved drive mechanism for the auger of a crop-harvesting header which is durable in construction, inexpensive to manufacture, carefree of maintenance, facile in assemblage, and simple and effective in use.

It is a still further object of the instant invention to provide a drive system for the auger of a crop-harvesting header that includes a slip clutch to slow or stop auger rotation upon encountering a slug or foreign object of sufficient size, and pawls on the drive sprocket that engage a ratchet wheel on the auger drive shaft when the drive is reversed to provide positive power to the auger in reverse to eject the obstruction.

DESCRIPTION OF THE DRAWINGS

The advantages of this invention will be apparent upon consideration of the following detailed disclosure of the invention, especially when taken in conjunction with the accompanying drawings wherein:

FIG. 4 is an exploded view of the drive clutch shown in FIG. 3.

DESCRIPTION OF THE PREFERRED EMBODIMENT

Figure 1:
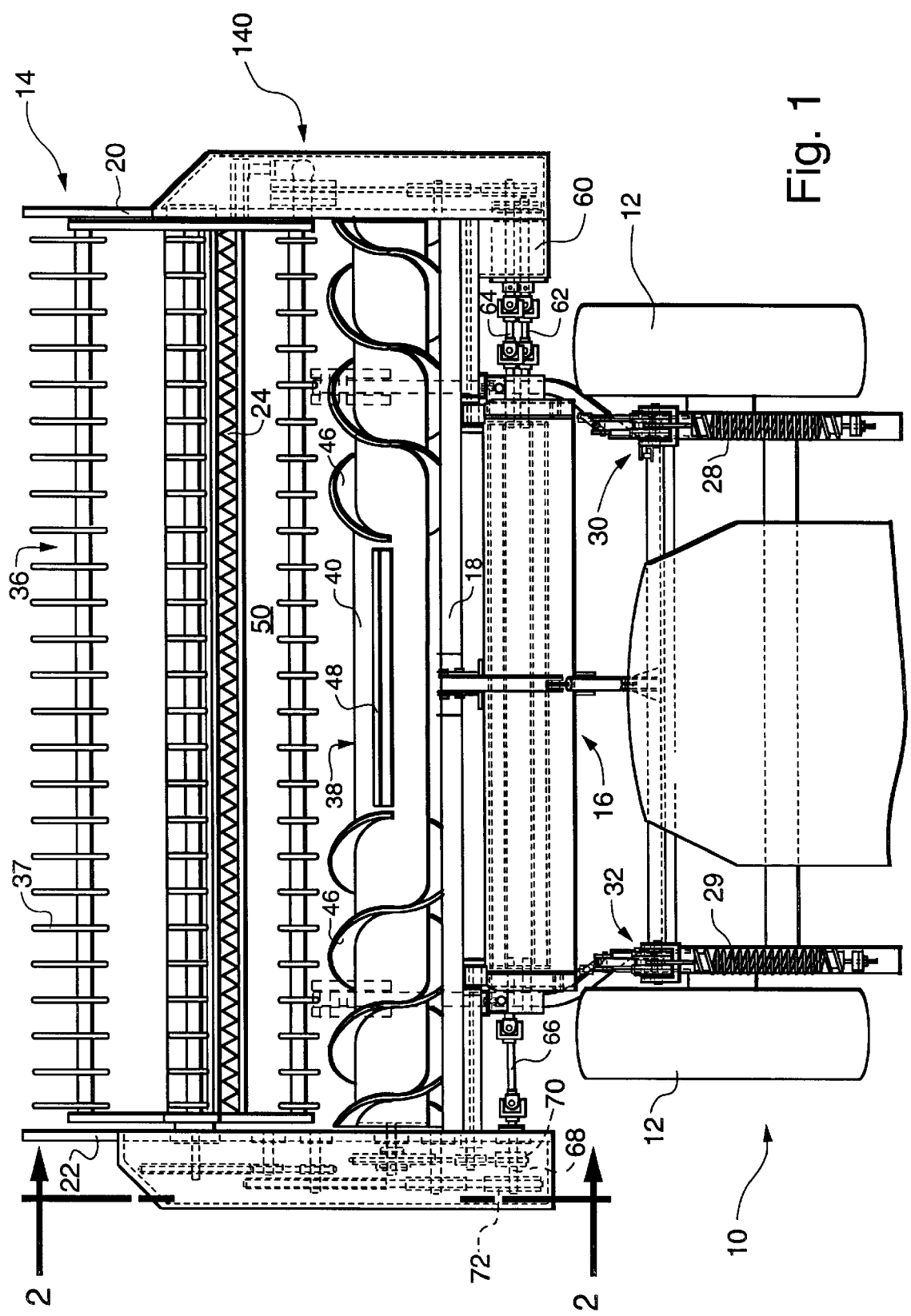
FIG. 1 is a top plan view of a windrow header employing the teachings of the instant invention.

Referring particularly now to FIG. 1, the forward portion of the tractor 10 is shown to include a pair of transversely spaced driving wheels 12 that provide the principal support not only for the tractor, but also the header mechanism 14 and the conditioner unit 16 which are, respectively, independently supported by the forward portion of the tractor 10 by means to be described hereinafter.

The header 14 comprises a main frame 18 of substantial width for purposes of permitting the header to harvest a swath of forage crops, or the like, of a substantial range of different widths within the range, for example, of between ten and sixteen or more feet. Particularly where the forage crop does not grow to substantial heights, it is more efficient and economical to cut a relatively wide swath of said material and then consolidate the same into a substantially narrowed windrow in which form the crop dries and from which it is fed to subsequent portable harvesting equipment. The main frame 18 has opposite sides 20 and 22, which are of substantial length, extending forwardly from the tractor 10. Said main frame is supported preferably for floating substantially vertical movement to enable the sickle bar assembly 24 normally to be positioned close to the exemplary ground surface 26 (see FIG. 2) by the employment of skids or shoes (not shown) which are fixed to the main frame 18 at opposite sides thereof. The sickle bar assembly 24 also extends between the opposite sides of the main frame 18 so as to cut a swath of material substantially equal to the width of the main frame 18.

The main frame 18 is connected to and supported by the forward end of the tractor 10 by pairs of heavy links 30 and 32 which respectively extend from opposite sides of the tractor 10 and the links of each pair are spaced vertically above each other. By such arrangement of substantially parallel upper and lower links 30 and 32, the vertical movement of the header 14 with respect to the tractor 10 will be permitted while the header remains generally horizontal in all vertical positions of operation. The supporting structure is well known in the art, as generally shown by U.S. Pat. No. 3,324,639.

In the preferred mounting of the header 14 with respect to the forward end of tractor 10, although the header normally substantially rides upon the skid shoes which slide over the ground, the full weight of the header is by no means sustained by the skid shoes in that appropriate tensioning means, such as springs 28 and 29, extending from the forward end of tractor 10 sustain the majority of the weight of the header 14. Further, the fragmentary link means are intended to exemplify an elevating mechanism, not shown in detail, but supported by the forward portion of tractor 10 and arranged to be operated to move the header 14 from its lowermost operative position, as illustrated generally in FIG. 2, to various elevated positions. Such tensioning and elevating mechanisms are not an essential part of the present invention and thus details are not believed to the necessary.

To facilitate the movement of crop material toward the sickle bar assembly 24, a conventional reel 36 extends between the opposite sides of main frame 18 and is rotatably supported for movement about an axis fixed with respect to main frame 18. The reel preferably is of the type having rows of tines 37 extending from pivoted rods actuated by cams, not shown in detail, in the ends of the reel to cause the rows of tines 37 to produce a sweeping-like motion that rakes and impels the cut crop material up toward the auger consolidating means, and then release the material, just before engagement by the auger.

Also supported by main frame 18 rearwardly of the reel 36, upwardly from and rearwardly of the sickle bar assembly 24, is an auger 38, the axis of which is substantially parallel to that of reel 36 and the auger extends between the opposite sides of the frame 18 as is clearly shown in FIG. 1. The auger comprises a central tube 40 and coaxial therewith at opposite ends are axle means 100 (see FIG. 2) which allow the auger to rotate.

A plurality of helical flights 46 respectively extend inwardly from the opposite ends of auger 38 and preferably terminate short of the central portion of the tube 40, the flights being oppositely spiraled as is best shown in FIGS. 1. The flights are connected in any appropriate manner to the central tube 40. The central portion of tube 40 preferably has means by which a plurality of substantially radially extending paddles 48 (only one of which is shown) may be detachably connected to said tube, whereby when the header is used without employment of the conditioner unit 16, the paddles 48 may be removed because they normally are not required under such circumstances.

Figure 2:
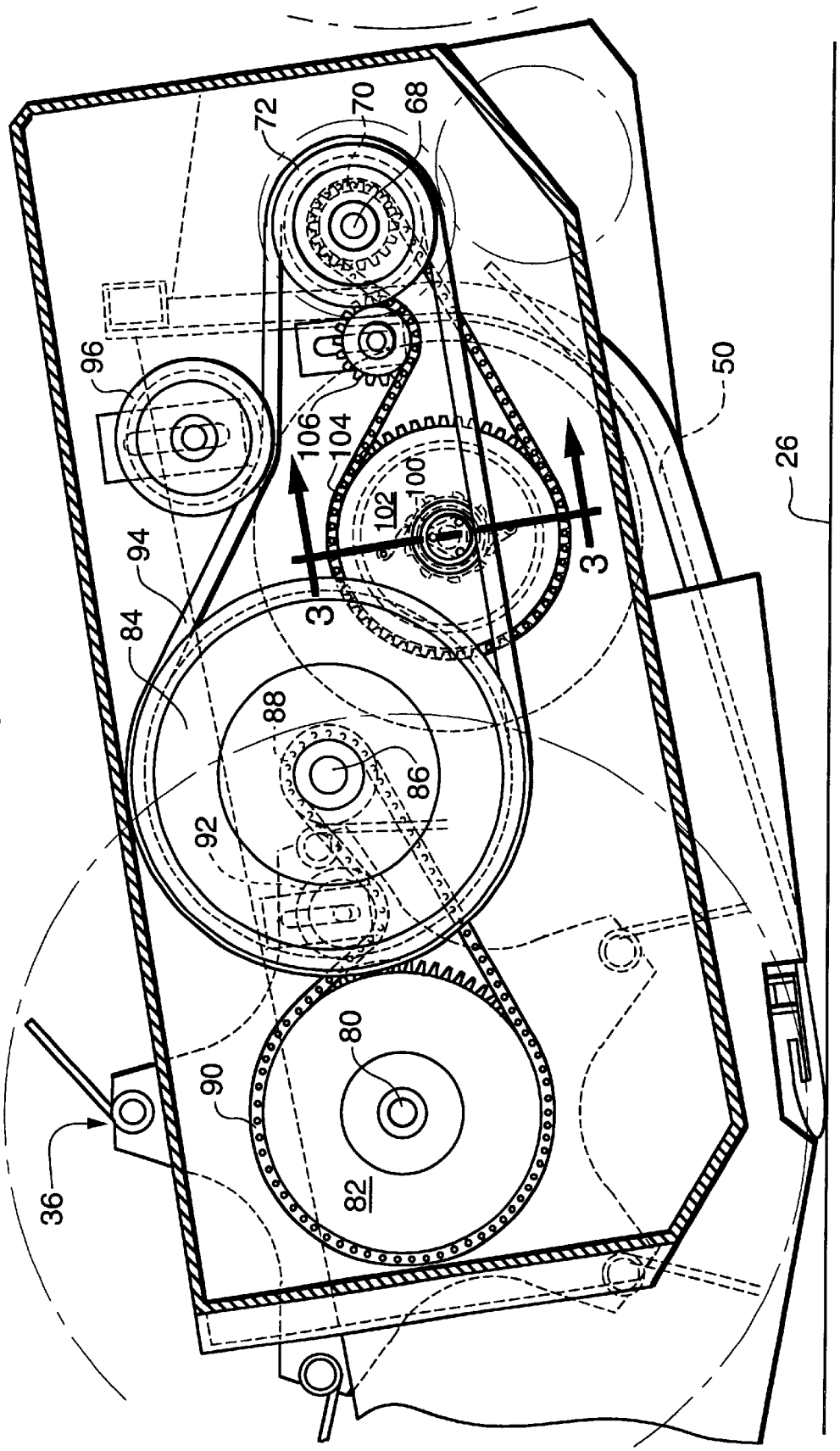
FIG. 2 is an end view of the header of FIG. 1, taken along line 2—2 of FIG. 1.

Also extending transversely between the opposite sides of frame 18 is an arcuate shield 50 which is disposed adjacent the lower and rearward portions of the peripheral confines of the helical flights 46, but, as best shown in FIG. 2, the shield is at least slightly spaced from such confines. The shield 50 is fixedly connected to main frame 18 for support thereby and, intermediately of the ends thereof, is provided with an exit opening, not shown, which is substantially narrower than the full width of the shield 50. The exit opening serves to discharge a full swath of cut forage material that has been consolidated by the auger approximately to about one-third of the width of the original swath.

To promote the smooth and efficient passage of cut material from the sickle bar assembly 24 to the shield 50, and especially to promote the passage of cut material beneath the central tube 40 of auger 38, there is provided an upwardly and rearwardly extending guide means, not shown in detail, but described in U.S. Pat. No. 3,324,639 which is incorporated herein in its entirely by reference. The consolidating auger structure thus far described is commonly known in the art as a "floating" auger. When slugs or foreign objects such as rocks, small animals, tree branches, bushes, and the like are encountered by the harvester, the auger may move upwardly and rearwardly to allow the item to pass, thereby reducing the likelihood of damage to the machine. Unfortunately, there are situations where the slug or foreign object is too large to pass, and the auger becomes clogged and non-operational. Obviously, this can result in costly damage to the machine and extended down time. The present invention, as will be described below, is intended to remedy this problem.

The structure to be described includes two primary elements: (1) a slip clutch; and (2) a positively powered reverse drive.

Attention is again directed to FIG. 1 and FIG. 2, where it can be seen that the drive system for header 14 initiates with the header drive hydraulic motor 60, which is, in turn, driven by a hydraulic pump (not shown) powered by the engine of tractor 10. Through universal transfer shafts 62 and 64 the two conditioner rolls are provided the power to rotate and condition cut crop material. A third universal transfer shaft, 66, at the opposite end of the upper conditioner roll, rotates driver shaft 68 that extends through the side 22 of header 10. Driver shaft 68 has affixed thereto on the outward end portion thereof a driver sprocket 70 and a reel drive variable sheave 72. Thus, motor 60 rotates the conditioner rolls and provides rotational power to the drive sprocket 70 and sheave 72 on the far side of the header.

The central shaft 80 of reel 36 is rotated from the left side of header 14 by reel drive sprocket 82, fixed to shaft 80. A reel sheave 84 is affixed to stub shaft 86 and to a smaller reel drive sprocket 88. A drive chain 90 engages the teeth on sprockets 82 and 88 such that rotation of sheave 84 results in rotation of reel 36. A tensioning sprocket 92 may be provided to maintain the appropriate chain tension. The relative operational diameters of the sprockets and sheaves are selected to provide the appropriate reel speed to ground speed ratios.

A v-belt 94 is fitted to the two sheaves 72 and 84 such that rotation of sheave 72 results in rotation of the reel 36. As discussed above, an adjustable tensioning pulley 96 may be advantageously added to extend the operational life of the v-belt 94 and improve the operation of the drive system.

Auger 38 is provided with an axial shaft 100 about which the auger rotates. On the left outward end of shaft 100 there is located a drive sprocket 102. Drive chain 104 engages the teeth on sprockets 70 and 102 such that rotation of sprocket 102 causes auger 38 to rotate in a relationship determined by the relative diameters of the two sprockets. A tensioning sprocket 106 can be added to take up unwanted slack in chain 104.

Figure 3:
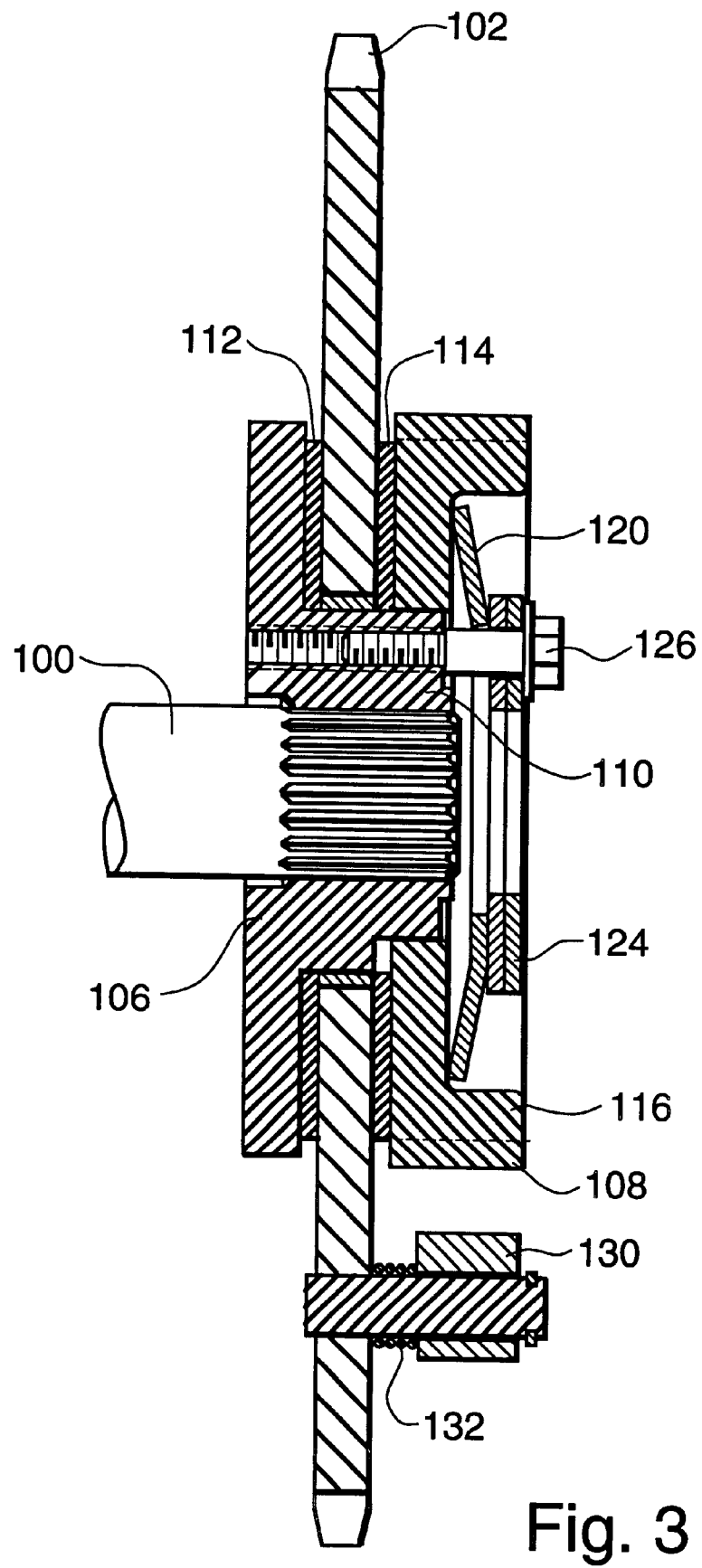
FIG. 3 is a cross-sectional view of FIG. 2, taken along line 3—3.

For a more detailed explanation of the clutch and positive reverse drive structure, attention is directed to FIGS. 3 and 4. FIG. 4 is an exploded view of FIG. 3, which is a cross-sectional of the left end of the auger shaft 100. Drive sprocket 102 is loosely fitted onto shaft 100, i.e., it is not fixed to the shaft and can rotate independently thereon. Drive sprocket 102 can be selectively powered, as part of the drive system described above, to rotate in either the forward direction (F) or the reverse direction (R) as indicated by arrow 105. A driven hub 106 is fixed to shaft 100 by an appropriate means, such as, for example, a key and lock nut, so that hub 106 does not slip relative to the shaft. The hub is also formed with a protruding collar, 110, thereon with threaded boltholes therein for purposes to be described below. A pair of friction discs, 112 and 114, one on either side of sprocket 102, are positioned to engage the planar surfaces of sprocket 102. Ring 116 is next in line, and has a generally triangular-shaped opening, 118, centrally therethrough so that it is not solidly affixed to shaft 100. A disk spring 120, or pressure plate, somewhat like a Belleville washer, is next. An end plate, or cover, 124 forms the terminal end of assembly. End bolts 126 extend through end plate 124 and the semi-circular cutouts in pressure plate 120, through the central openings in the friction discs and sprocket and into threaded boltholes in collar 110. When tightened, bolts 126 pull all of the elements together into a sandwich-like assembly, as shown in FIG. 3, that initially functions as a slip clutch.

When the header drive is operating in the forward direction, shaft 100 will rotate so long as the braking force set by the pressure plate 120 or the frictional forces between the friction discs 112 and 114 and sprocket 102 are not overcome by forces in the opposite direction created by a slug or foreign object in contact with the auger. When such forces are encountered, the operator would reverse the header drive to try to push the object out of the auger; however, in many instances this mere reversal does not provide sufficient force to reach this objective, i.e., the slip clutch slips both in the forward and reverse directions.

It has been determined that the problem discussed immediately above may be overcome by developing a more positive reverse drive, i.e., a drive that does not allow the clutch to slip in the reverse direction. Continuing to look at FIGS. 3 and 4, it can be seen that the outer edge of ring 116 is formed with uniformly spaced ratchet teeth 108 thereabout. A pair of opposing pawls, 130, are pinned to sprocket 102 and located in the assembly to engage teeth 108. Thus, when the drive system is causing the slip clutch to slip in the forward direction, pawls 130 ride over teeth 108, and when working in the reverse direction, the pawls 130 engage teeth 108 and positively drive shaft 100. The pawls may be advantageously biased into contact with teeth 108 by, for example, springs 132. While two pawls are shown, it is to be understood that any reasonable number may be employed.

On the side of the main frame opposite the auger and reel drives there is a conventional sickle bar drive assembly 140. This assembly, not forming a significant part of this invention, is also powered by hydraulic motor 60 and operates in a conventional manner. It is clearly possible to replace this sickle bar with another type of cutting mechanism, such as, for example, a disc cutterhead.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A crop-harvestina header arranged to be supported by the forward end of a tractor and comprising in combination:
    a main frame of substantial width and having a front end and opposing rear end, an upper portion and an opposing lower portion, and opposing lateral sides;
    a mechanism attachable to a tractor and connected to said main frame to support said main frame for vertical movement relative to the ground;
    a cutterhead assembly supported by he lower portion of said frame and extending between said lateral sides thereof to cut a swath substantially as wide as said main frame;
    a floating consolidating auger extending horizontally between said lateral sides of said main frame, said auger having oppositely spiraled helical flights extending inwardly from opposite ends thereof and a central axial shaft about which said auger rotates;
    an arcuate shield adjacent the lower and rearward portions of said auger to guide cut and consolidated crop material rearwardly;
    a drive mechanism connected to one end of said axial shaft of said auger and adapted to selectively rotate said auger in either forward or reverse directions, said drive mechanism including a slip clutch to allow the temporary interruption of Power transfer between said drive mechanism and said axial shaft when a preset counterforce is encountered by aid auger, and a positive drive to bypass said slip clutch when said auger is driven in said reverse direction; and
    said positive drive inducing:
        a hub affixed to said axial shaft; and
        a ratchet mechanism in driving relationship to said hub, said ratchet mechanism including a ring mounted on said axial shaft with peripheral ratchet teeth on said ring arranged to rotate said hub in said forward direction, but not in said reverse direction.

2. A crop-harvesting header arranged to be supported by the forward end of a tractor and comprising in combination:
    a main frame of substantial width and having a front end and opposing rear end, an upper portion and an opposing lower portion, and opposing lateral sides;
    a mechanism attachable to a tractor and connected to said main frame to support said main frame for vertical movement relative to the around;
    a cutterhead assembly supported by the lower portion of said frame and extending between said lateral sides thereof to cut a swath substantially as wide as said main frame;
    a floating consolidating auger extending horizontally between said lateral sides of said main frame, said auger having oppositely spiraled helical flights extending inwardly from opposite ends thereof and a central axial shaft about which said auger rotates;
    an arcuate shield adjacent the lower and rearward portions of said auger to guide cut and consolidated crop material rearwardly;
    a drive mechanism connected to one end of said axial shaft of said auger and adapted to selectively rotate said auger in either forward or reverse directions, said drive mechanism including a slip clutch to allow the temporary interruption of power transfer between said drive mechanism and said axial shaft when a preset counterforce is encountered by said auger, and a positive drive to bypass said slip clutch when said auger is driven in said reverse direction;

said slip clutch is an adjustable friction-type slip clutch and said positive drive includes:
  a hub affixed to said axial shaft; and
  a ratchet mechanism in driving relationship to said hub, said ratchet mechanism including a ring mounted on said axial shaft with peripheral ratchet teeth on said ring arranged to rotate said hub in said forward direction, but not in said reverse direction.

3. The crop-harvesting header of claim 2, wherein said drive mechanism further includes:
  a first sprocket with an axial opening therethrough, said opening being slightly larger in diameter than the diameter of said axial shaft;
  said axial shaft extending through said opening in said first sprocket such that said first sprocket is freely rotatable on said axial shaft;
  an hydraulic motor connected to a second sprocket and arranged to selectively rotate said second sprocket in forward or reverse directions; and
  a closed-loop chain engaged with both said first and second sprockets such that rotation of said second sprocket causes rotation of said first sprocket.

4. The crop-harvesting header of claim 3, wherein:
  said hub is adjacent said first sprocket; and
  said first sprocket has at least one pawl attached thereto and positioned to engage said ratchet teeth on said hub such that rotation of said first sprocket in said rearward direction causes said at least one pawl to positively engage said ratchet teeth to rotate said axial shaft in the reverse direction.

5. In a crop-harvesting header arranged to be supported by the forward end of a tractor, said header comprising: a main frame of substantial width and having a front end and opposing rear end, an upper portion and an opposing lower portion, and opposing lateral sides;
  a mechanism attachable to a tractor and connected to said main frame to support it for vertical movement relative to the ground;
  a cutterhead assembly supported by the lower portion of said frame and extending said lateral thereof to cut a swath substantially as wide as said main frame;
  a floating consolidating auger extending horizontally between said lateral sides of said main frame, said auger having oppositely piraled helical flights extending inwardly from opposite ends thereof and a central axial shaft about which said auger rotates;
  an arcuate shield adjacent the lower and rearward portion of said auger to guide cut and consolidated crop material rearwardly, the improvement comprising:
    a drive mechanism connected to one end of said axial shaft of said auger and adapted to selectively rotate said auger in either forward or reverse directions, said drive mechanism including a slid clutch to allow the temporary interruption of power transfer between said drive mechanism and said axial shaft when a preset counterforce is encountered by said auger, and a positive drive to by ass said slip clutch when said auger is driven in said reverse direction; and
    said positive drive including:
      a hub affixed to said axial shaft and having peripheral ratchet teeth thereon, said hub being rotatable in said forward direction, but not rotatable in said reverse direction.

6. In a crop-harvesting header arranged to be supported by the forward end of a tractor, said header comprising: a main frame of substantial width and having a front end and opposing rear end, an upper portion and an opposing lower portion, and opposing lateral sides;
  a mechanism attachable to a tractor and connected to said main frame to support it for vertical movement relative to the ground;
  a cutterhead assembly supported by the lower portion of said frame and extending between said lateral sides thereof to cut a swath substantially as wide as said main frame;
  a floating consolidating auger extending horizontally between said lateral sides of said main frame, said auger having oppositely spiraled helical flights extending inwardly from opposite ends thereof and a central axial shaft about which said auger rotates;
  an arcuate shield adjacent the lower and rearward portions of said auger to guide cut and consolidated crop material rearwardly, the improvement comprising:
    a drive mechanism connected to one end of said axial shaft of said auger and adapted to selectively rotate said auger in either forward or reverse directions, said drive mechanism including a slip clutch to allow the temporary interruption of power transfer between said drive mechanism and said axial shaft when a preset counterforce is encountered by said auger, and a positive drive to bypass said slip clutch when said auger is driven in said reverse direction;
    said slip clutch is an adjustable friction-type slip clutch and said positive drive includes:
      a hub affixed to said axial shaft and having peripheral ratchet teeth thereon, said hub being rotatable in said forward direction, but not rotatable in said reverse direction.

7. The crop-harvesting header of claim 6, wherein said drive mechanism further includes:
  a first sprocket with an axial opening therethrough, said opening being slightly larger in diameter than the diameter of said axial shaft;
  said axial shaft extending through said opening in said first sprocket such that said first sprocket is freely rotatable on said axial shaft;
  an hydraulic motor connected to a second sprocket and arranged to selectively rotate said second sprocket in forward or reverse directions; and
  a closed-loop chain engaged with both said first and second sprockets such that rotation of said second sprocket causes rotation of said first sprocket.

8. The crop-harvesting header of claim 7, wherein:
  said hub is adjacent said first sprocket; and
  said first sprocket has at least one pawl attached thereto and positioned to engage said ratchet teeth on said hub such that rotation of said hub in said rearward direction, causes said at least one pawl to positively engage said ratchet teeth to rotate said axial shaft in the reverse direction.

9. A header for a crop-harvesting machine comprising:
  a frame of substantial width and having a front end and opposing rear end, and opposing lateral sides;

a mechanism to attach the header to a crop-harvesting machine;

a cutterhead assembly supported by said frame and extending between said lateral sides thereof to cut a swath substantially as wide as said frame;

a floating consolidating auger extending horizontally between said lateral sides of said frame, said auger having oppositely spiraled helical flights extending inwardly from opposite ends thereof and a central axial shaft about which said auger rotates;

an arcuate shield adjacent the lower and rearward portions of said auger to guide cut and consolidated crop material rearwardly;

a drive mechanism connected to one end of said axial shaft of said auger and adapted to selectively rotate said auger in either forward or reverse directions, said drive mechanism including a slip clutch to allow the temporary interruption of power transfer between said drive mechanism and said axial shaft when a preset counterforce is encountered by said auger, and a positive drive to bypass said slip clutch when said auger is driven in said reverse direction; and said positive drive including:

a hub affixed to said axial shaft and having peripheral ratchet teeth thereon, said hub being rotatable in said forward direction, but not rotatable in said reverse direction.

10. The header of claim 9, wherein said drive mechanism further includes:

a first sprocket with an axial opening therethrough, said opening being slightly larger in diameter than the diameter of said axial shaft;

said axial shaft extending through said opening in said first sprocket such that said first sprocket is freely rotatably on said axial shaft;

an hydraulic motor connected to a second sprocket and arranged to selectively rotate said second sprocket in forward or reverse directions; and a closed-loop chain engaged with both said first and second sprockets such that rotation of said second sprocket causes rotation of said first sprocket.

11. The crop-harvesting header of claim 10, wherein:

said hub is adjacent said first sprocket; and said first sprocket has at least one pawl attached thereto and positioned to engage said ratchet teeth on said hub such that rotation of said hub in said rearward direction causes said at least one pawl to positively engage said ratchet teeth to rotate said axial shaft in the reverse direction.

* * * * *